July 25, 1972      SI SPIEGEL      3,679,528
INDOOR-OUTDOOR ARTIFICIAL CHRISTMAS TREE
Filed Oct. 30, 1970
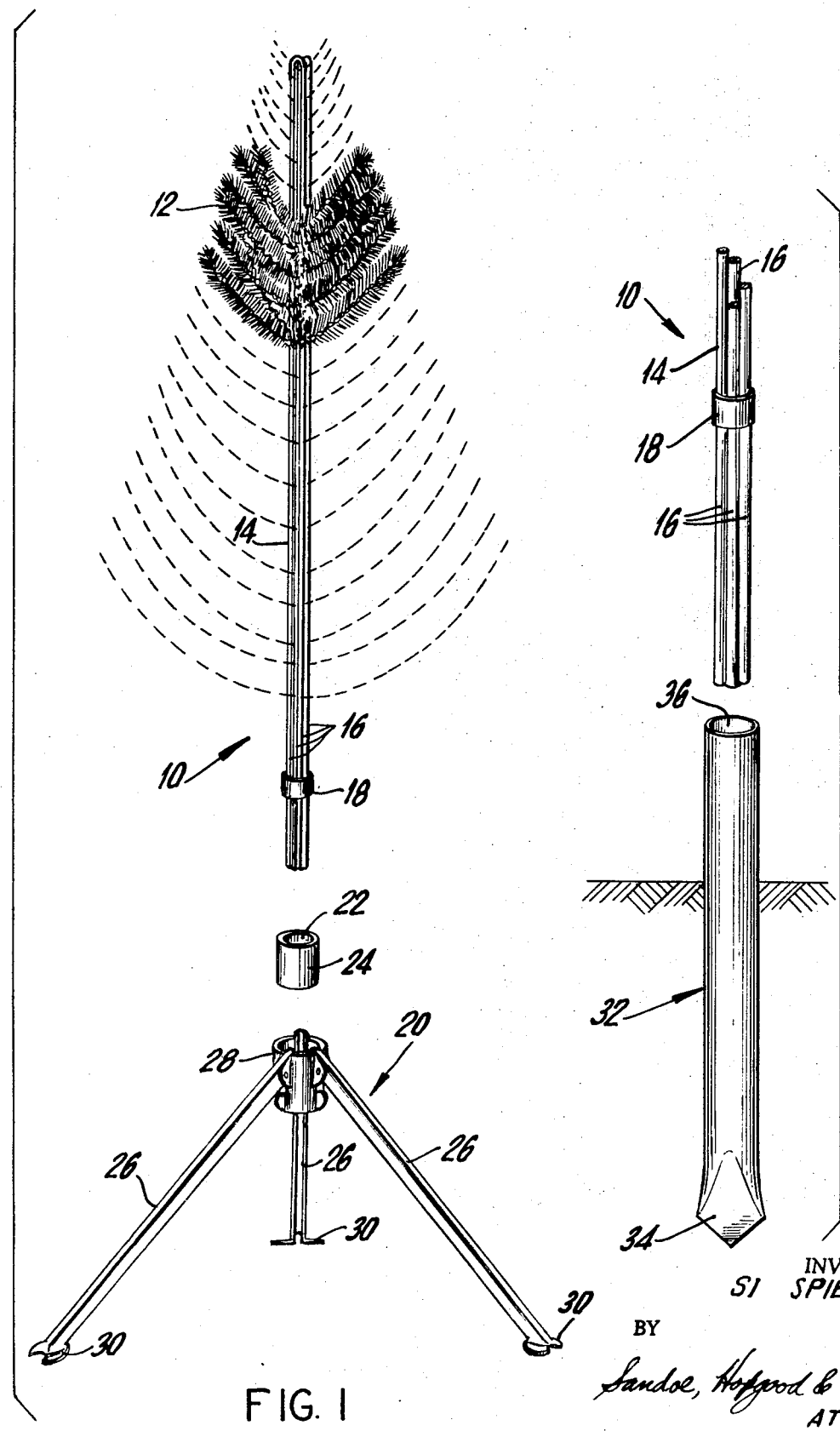
INVENTOR.
SI SPIEGEL
BY
Sandoe, Hopgood & Calimafde
ATTORNEYS

3,679,528
INDOOR-OUTDOOR ARTIFICIAL CHRISTMAS TREE

Si Spiegel, Briarcliff Manor, N.Y., assignor to American Technical Industries, Inc., Mount Vernon, N.Y.
Filed Oct. 30, 1970, Ser. No. 85,672
Int. Cl. A47g 33/06, 33/12
U.S. Cl. 161—24  2 Claims

ABSTRACT OF THE DISCLOSURE

An artificial tree such as an artificial Christmas tree which can be mounted indoors during the holiday season and thereafter removed and mounted in an outdoor setting. For indoor mounting the wire trunk of the tree is fitted into an apertured block which is in turn inserted into an indoor stand. For outdoor mounting, the tree is removed from the block and fitted into the open end of a stake which is pointed at its other end for insertion into the ground.

---

The present invention relates generally to artificial trees, and more particularly to an artificial Christmas tree which can be mounted either indoors or outdoors as desired.

In recent years the use of artificial Christmas trees has to a great extent supplanted the use of the generally more expensive natural Christmas tree. The increasing use of the articial tree has been partly a result of the increasing life-like and natural quality that can be imparted to the artificial trees through recently developed, improved techniques such as that disclosed in co-pending application entitled Artificial Tree and Method of Assembly, Ser. No. 814,931, filed on Apr. 10, 1969 and assigned to the assignee of the present invention.

In most homes the Christmas tree is assembled, mounted and trimmed several days before Christmas after which it remains on display for a short period following Christmas, and usually disassembled on about New Year's Day. The tree is thereafter either discarded, or as is more common, stored away along with the tree lights and decorations until the following Christmas, since there is at present no truly practical and economical manner to utilize the tree in any other suitable environment such as by placing it outdoors.

It is an object of the invention to provide an artificial tree such as a Christmas tree, which can be used both indoors and outdoors in all seasons of the year.

It is a further object of the invention to provide an artificial tree which can be readily and securely installed both indoors and outdoors through the use of relatively simple and inexpensive additional components.

The artificial tree of the invention is in the form of a plurality of artificial branches clamped and thereby securely retained between a plurality of wires, the latter being clamped together to define the "trunk" of the artificial tree. For indoor mounting of the tree, the lower end of the trunk is snugly fitted within an aperture formed in a block or the like, which in turn, is securely fitted within an opening in a tree stand. The opening of the stand has a diameter substantially equal to that of the block but larger than that of the "trunk."

When it is desired to mount the tree outdoors, such as to emulate a shrub, or the like, the tree and block are removed from around the lower end of the trunk, and the trunk is thereafter inserted into the upper open end of a ground stake, which is pointed at its lower end for easy insertion into the ground.

To the accomplishment of the above and to such further objects as may hereinafter appear, the present invention relates to an indoor-outdoor artificial Christmas tree substantially as defined in the appended claims and as described in the following specification taken together with the accompanying drawing in which:

FIG. 1 is an exploded perspective view, with the tree shown partly schematically, of the indoor mounting arrangement of the artificial tree of the invention; and FIG. 2 is a perspective fragmented view, on an enlarged scale as compared to FIG. 1, of the lower end of the outdoor mounting arrangement of the artificial tree of the invention.

The artificial tree of the invention as generally shown in FIGS. 1 and 2 can be mounted with equal facility both indoors and outdoors. As shown, the tree which is generally designated 10 comprises a plurality of artificial branches 12 which may be formed according to any of the known techniques. Branches 12 are attached to a trunk 14 which as herein shown comprises a plurality of trunk wires 16. The attachment of the branches 12 to the trunk 14 may be advantageously effected according to the structure disclosed in said co-pending application to which reference is made.

As disclosed more completely in said application, the branches 12 are piled through the open ends of a plurality of V-shaped wires 16 which are placed together in a generally conical array. Thereafter, the branches are secured between the wires by pulling the ends of the wires together. The lower ends of the wires are then urged against one another such as by a metallic clamp or collar 18 placed securely around the lower end of the trunk.

In accordance with the present invention, when it is desired to mount tree 10 indoors within a tripod stand 20 (FIG. 1), the lower end of the clamped wires 16 is fitted through a central passageway 22 formed in a cylindrical plug or block 24, which may be made of any suitable material such as wood. Stand 20 includes, as is conventional, three legs 26 pivotally joined at their upper ends to a cylindrical hollow collar 28. Feet 30 are provided at the lower ends of legs 26 to provide a stable support for the stand.

The diameter of passageway 22 is substantially equal to the thickness or width of the trunk 14 of the tree, and the outer diameter of block 24 is substantially equal to the inner diameter of collar 28. As a result, trunk 14 is snugly and securely, although removably, received and retained within block 24, and the tree and block assembly are also snugly received and securely, although removably, retained within collar 28 of stand 20.

When it is desired to employ the tree 10 outdoors as a shrub or the like, such as following the Christmas season, the tree and block assembly are removed from the indoor stand. Block 24 is thereafter removed from the trunk by being manually pulled away from the tree. As shown in FIG. 2, a metallic, preferably rust-free pipe or stake 32 is placed into the ground. Stake 32 includes a lower end formed into a point 34 and has an open upper end 36 extending slightly above the ground. The interior diameter of end 36 of stake 32 is essentially equal to that of passageway 22 so that the lower end of the trunk 14 is snugly, although removably, received within the interior of the ground stake to thereby provide secure retention of the artificial tree within the stake for outdoor mounting. When desired in the future, such as in the following Christmas season, the tree is removed from the ground stake, reinserted into block 24, and then along with the block, the trunk of the tree is refitted into the indoors stand as shown in FIG. 1.

The artificial tree of the invention is thus admirably suited for mounting outdoors as well as indoors. This increased utilization of the tree is achieved by the use of relatively inexpensive and yet sturdy and reliable components. As a result, little additional cost is involved in providing the extra outdoor mounting feature.

While the invention has been herein specifically described with respect to one embodiment thereof, it will be apparent that modifications may be made therein without departing from the spirit and scope of the invention.

I claim:

1. An indoor-outdoor artificial tree assembly comprising a plurality of branches, a plurality of wires, means for urging said wires against one another to form a trunk and secure said branches between adjacent ones of said wires at the upper end of said thus-formed trunk, an indoor stand having a collar defining a first opening therein, support means extending from said collar, and diameter restricting means inserted into said first opening and having a passageway therein of a diameter less than that of said first opening and slightly larger than the width of the lower end of said trunk for releasably but snugly receiving the lower end of said trunk for indoor use of the tree, and a stake having a sharpened lower end for insertion of said stake into the ground, and a second opening in its upper end of a diameter substantially the same as that of said passageway in said diameter restricting means for releasably but snugly receiving said trunk for outdoor use of the tree.

2. The tree assembly of claim 1, in which said diameter restricting means comprises a plug having said passageway centrally formed therein, and having an outer diameter substantially equal to the diameter of said first opening in said indoor stand.

References Cited

UNITED STATES PATENTS

| | | | |
|---|---|---|---|
| 2,749,639 | 6/1956 | D'Agnillo | 161—24 |
| 3,064,379 | 11/1962 | Hertzberg | 161—24 |
| 1,555,475 | 9/1925 | Maunz | 161—27 X |
| 3,527,355 | 9/1970 | Boyer | 248—156 X |
| 2,358,089 | 9/1944 | LeGere | 248—156 X |
| 3,339,869 | 9/1967 | Anderson | 248—156 X |
| 1,689,530 | 10/1928 | Landers | 161—22 |
| 2,733,881 | 2/1956 | Threlfall et al. | 248—27.8 |

PHILIP DIER, Primary Examiner

U.S. Cl. X.R.

161—27, 31; 248—27.8, 156